US012610955B2

(12) United States Patent
Long et al.

(10) Patent No.: US 12,610,955 B2
(45) Date of Patent: Apr. 28, 2026

(54) BIOLOGICAL CONTROL METHOD FOR CILIATE DISEASE

(71) Applicant: Ocean University of China, Shandong (CN)

(72) Inventors: Hongan Long, Qingdao (CN); Yurou Jiang, Qingdao (CN); Jiao Pan, Qingdao (CN)

(73) Assignee: Ocean University of China, Qingdao (CN)

( * ) Notice: Subject to any disclaimer, the term of this patent is extended or adjusted under 35 U.S.C. 154(b) by 348 days.

(21) Appl. No.: 18/448,948

(22) Filed: Aug. 13, 2023

(65) Prior Publication Data

US 2024/0057609 A1     Feb. 22, 2024

(30) Foreign Application Priority Data

Aug. 17, 2022     (CN) .......................... 202210984691.8

(51) Int. Cl.
| | |
|---|---|
| *A01N 63/00* | (2020.01) |
| *A01P 1/00* | (2006.01) |
| *C12R 1/90* | (2006.01) |

(52) U.S. Cl.
CPC ................ *A01N 63/00* (2013.01); *A01P 1/00* (2021.08); *C12R 2001/90* (2021.05)

(58) Field of Classification Search
CPC ....... A01N 63/00; A01P 1/00; C12R 2001/90; Y02A 40/81; A01K 61/13
See application file for complete search history.

*Primary Examiner* — Kade Ariani
(74) *Attorney, Agent, or Firm* — Harness, Dickey & Pierce, P.L.C.

(57) ABSTRACT

The present disclosure provides a biological control method for ciliate disease, and belongs to the technical field of biological control. The biological control method includes the following step: adding *Chaenea vorax* into an aquaculture pond to control the ciliate disease; and the *Chaenea vorax* includes *Chaenea vorax* PJ13002. According to the present disclosure, the *Chaenea vorax* PJ13002, a predatory protozoan, is introduced to recover a microbial food chain existing in nature in an aquaculture system and achieve biological control of the ciliate disease. Meanwhile, the *Chaenea vorax* PJ13002 can be directly ingested by aquaculture animals without causing diseases, so that a more stable aquaculture system can be formed, losses are avoided, costs are reduced, and economic benefits are increased. The method provides a new thought for controlling the ciliate disease and has an excellent popularization and application prospect.

9 Claims, 3 Drawing Sheets

Specification includes a Sequence Listing.

BIOLOGICAL CONTROL METHOD FOR CILIATE DISEASE

CROSS REFERENCE TO RELATED APPLICATION

This patent application claims the benefit and priority of Chinese Patent Application No. 202210984691.8, filed with the China National Intellectual Property Administration on Aug. 17, 2022, the disclosure of which is incorporated by reference herein in its entirety as part of the present application.

REFERENCE TO SEQUENCE LISTING

A computer readable XML file entitled "SEQUENCE LISTING.XML", that was created on Jul. 11, 2023, with a file size of about 2614 bytes, contains the sequence listing for this application, has been filed with this application, and is hereby incorporated by reference in its entirety.

TECHNICAL FIELD

The present disclosure belongs to the technical field of biological control, and particularly relates to a biological control method for ciliate disease.

BACKGROUND

Aquaculture is an important part of modern agriculture and serves as one of the main industries driving economic development. However, there are still numerous challenges in aquaculture, particularly microbial diseases caused by crowded agriculture space and water pollution. Ciliates are unicellular organisms (the body length is mostly between 20 and 1,000 μm, and the body shapes are various), commonly found in aquaculture water bodies. Certain rapidly growing species, such as parasitic scuticociliates, can infect various aquaculture animals such as fish and shellfish, leading to widespread primary or secondary infections and causing significant economic losses in the aquaculture industry.

At present, there are few studies on the parasitic diseases caused by ciliates in aquaculture animals, and there is no effective and safe control method for ciliate disease. Most control methods for ciliate disease are based on physical and chemical control, for example, adding better filtration systems, regularly cleaning ponds, and adding chemical reagents like salt, potassium permanganate, copper sulfate, chelated copper, and chili water. Some illegal farmers even soak the infected fish in formaldehyde to kill pathogenic ciliates. These methods will not only consume substantial manpower and material resources, but also cause food safety problems of aquaculture products. After these aquaculture products enter the market, various chemical constituents remaining in the body will harm the human body and cause acute or chronic diseases. Therefore, there is an urgent need to invent a safe and effective biological control method for ciliate disease.

SUMMARY

In view of the aforementioned challenges, the objective of the present disclosure is to provide a biological control method for ciliate disease. Use of the predatory ciliate *Chaenea vorax* for controlling the ciliate disease can form a more stable aquaculture system, avoid loss, reduce costs, and increase economic benefits.

To achieve the above objective, the present disclosure provides the following technical solution:

A biological control method for ciliate disease is provided. *Chaenea vorax* is added to an aquaculture pond to control the ciliate disease; and the *Chaenea vorax* includes *Chaenea vorax* PJ13002.

Preferably, the *Chaenea vorax* PJ13002 is available from an intertidal zone of Qingdao.

Preferably, the aquaculture pond is maintained at a temperature of 10-20° C., a salinity of 25-35%, and pH 6-9.

Preferably, based on a 30 mu aquaculture pond, the adding *Chaenea vorax* into an aquaculture pond specifically includes: if a density of ciliates is 0-5 individuals/mL, adding 4,000-6,000 *Chaenea vorax* into the aquaculture pond; if the density of ciliates is 6-50 individuals/mL, adding 8,000-12,000 *Chaenea vorax* into the aquaculture pond; if the density of ciliates is 51-200 individuals/mL, adding 25,000-35,000 *Chaenea vorax* into the aquaculture pond; and if the density of ciliates is greater than 200 individuals/mL, adding 95,000-110,000 *Chaenea vorax* into the aquaculture pond.

Preferably, the ciliates include scuticociliates.

Preferably, the scuticociliates include *Uronema marinum*.

Preferably, the *Uronema marinum* includes *Uronema marinum* PJ20101A.

Preferably, the *Uronema marinum* PJ20101A is available from an intertidal zone of Qingdao.

Preferably, animals cultivated in the aquaculture pond include *Scophthalmus maximus, Paralichthys olivaceus*, prawns, and flounders.

Compared with the prior art, the present disclosure has the following beneficial effects:

The present disclosure provides a biological control method for ciliate disease: adding *Chaenea vorax* PJ13002 into an aquaculture pond to control the ciliate disease. According to the present disclosure, the *Chaenea vorax*, a predatory protozoan, is introduced to recover a microbial food chain existing in nature in an aquaculture system and achieve biological control of the ciliate disease. Meanwhile, the *Chaenea vorax* can be directly ingested by aquaculture animals without causing diseases, so that a more stable aquaculture system can be formed, losses are avoided, costs are reduced, and economic benefits are increased. The method provides a new approach for the prevention and control of ciliate diseases and holds promising prospects for widespread application and implementation. Thought for controlling the ciliate disease and has an excellent popularization and application prospect.

BRIEF DESCRIPTION OF THE DRAWINGS

FIG. 1A shows the *Chaenea vorax* PJ13002, scale bar=50 μm; and FIG. 1B is the *Uronema marinum* PJ20101A, scale bar=10 μm.

DETAILED DESCRIPTION OF THE EMBODIMENTS

Figure 1A:
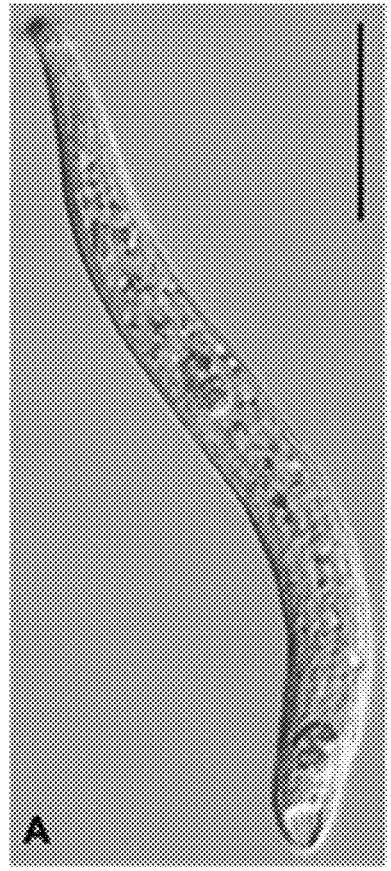
FIGS. 1A-B show micrographs of *Uronema marinum* PJ20101A and *Chaenea vorax* PJ13002.

The present disclosure provides a biological control method for ciliate diseases: adding *Chaenea vorax* into an aquaculture pond to control the ciliate diseases. The *Chaenea vorax* includes *Chaenea vorax* PJ13002.

The biological control method provided by the present disclosure can transform a simple energy transfer of "feed→aquaculture animals" in the aquaculture pond into a biological control route of "feed→bacteria→pathogenic ciliates→*Chaenea vorax*→aquaculture animals". This approach creates a green, safe and healthy aquaculture conditions. Moreover, this can increase diversified food sources for aquaculture animals. It effectively reduces diseases and enhances economic benefits in aquaculture operations.

The *Chaenea vorax* PJ13002 provided by the present disclosure is available from an intertidal zone of Qingdao, where the *Chaenea vorax* PJ13002 has a deposit number of CGMCC NO: 46992, and was deposited in the China General Microbiological Culture Collection Center (CGMCC) located at No. 3, Yard 1, Beichen West Road, Chaoyang District, Beijing, China, on Jan. 12, 2026.

The *Chaenea vorax* PJ13002, provided by the present disclosure, can be used for control of scuticociliate diseases in aquaculture, as well as for biological control and killing of ciliates in aquaculture. Meanwhile, the *Chaenea vorax* can be directly ingested by the aquaculture animals without causing diseases, forming a green aquaculture model based on biological control, reducing diseases and improving economic benefits.

In the present disclosure, the preferred temperature range for the aquaculture pond is 10 to 20° C., with an even more optimal temperature of 18° C. The preferred salinity range is 25 to 35%, with a more optimal salinity of 30%. The preferred pH range is 6 to 9, with a more optimal pH of 8. The predatory ciliate *Chaenea vorax* PJ13002 provided by the present disclosure has a wide range of adaptability to temperature, salinity and pH, and the growth conditions there of are in line with aquaculture conditions of *Scophthalmus maximus, Paralichthys olivaceus*, prawns, and flounders, and effective preying can be performed, so as to carry out biological control.

In the present disclosure, preferably based on a 30 mu aquaculture pond, adding *Chaenea vorax* to an aquaculture pond specifically includes: when the pathogenic ciliate density is between 0 and 5 individuals/mL, the preferred range for introducing predatory ciliates is 4,000 to 6,000 individuals, with a more optimal number of 5,000 individuals. When the pathogenic ciliate density is between 6 and 50 individuals/mL, the preferred range for introducing predatory ciliates is 8,000 to 12,000 individuals, with a more optimal number of 10,000 individuals. When the pathogenic ciliate density is between 51 and 200 individuals/mL, the preferred range for introducing predatory ciliates is 25,000 to 35,000 individuals, with a more optimal number of 30,000 individuals. When the pathogenic ciliate density exceeds 200 individuals/mL, the preferred range for introducing predatory ciliates is 95,000 to 110,000 individuals, with a more optimal number of 100,000 individuals.

In the present disclosure, the ciliates preferably include scuticociliates; the scuticociliates preferably include *Uronema marinum;* the *Uronema marinum* is *Uronema marinum* PJ20101A (the GenBank accession number of the *Uronema marinum* PJ20101A is OP050455); the *Uronema marinum* PJ20101A (*Uronema marinum*) is preferably from an intertidal zone of Qingdao, where the *Uronema marinum* PJ20101A has a deposit number of CGMCC NO: 46993, and was deposited in the China General Microbiological Culture Collection Center (CGMCC) located at No. 3, Yard 1, Beichen West Road, Chaoyang District, Beijing, China, on Jan. 12, 2026.

In the present disclosure, animals cultivated in the aquaculture pond preferably include *Scophthalmus maximus, Paralichthys olivaceus*, prawns, and flounders.

The technical solution provided by the present disclosure will be described in detail below with reference to examples, but they should not be construed as limiting the claimed scope of the present disclosure.

Example 1

Isolation, Culture and Identification of Pathogenic Scuticociliates and Predatory Ciliates The pathogenic *Uronema marinum* PJ20101A was isolated from the intertidal zone of Qingdao in December 2017. The predatory ciliate *Chaenea vorax* PJ13002 was isolated in July 2019.

Ulva and seawater were collected from the intertidal zone, temperature, salinity, and pH were measured. A single ciliate was isolated using a mouth pipette under a dissecting microscope. The single cell was passaged to establish a culture system.

Figure 1B:
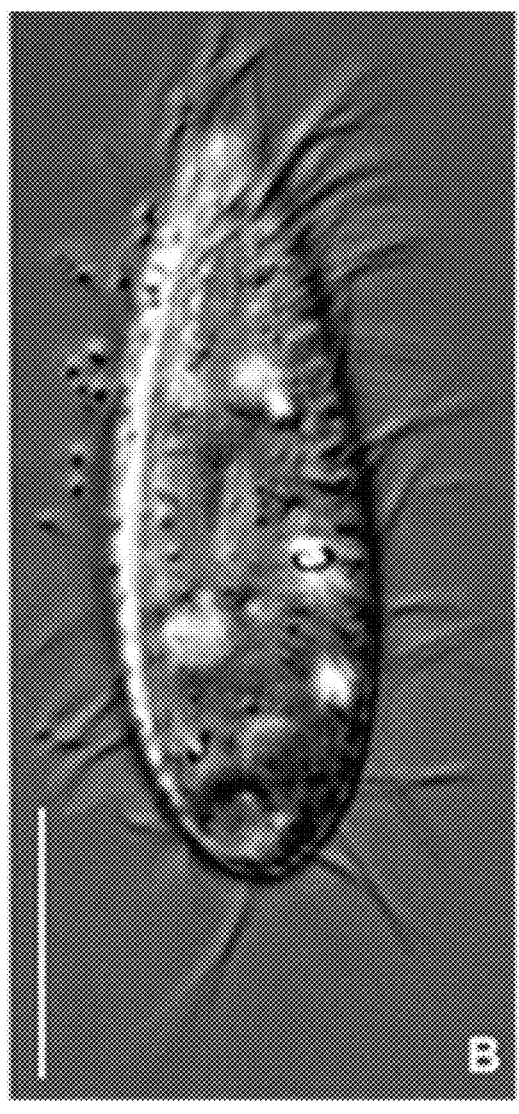

Micrographs were taken of *Uronema marinum* PJ20101A and *Chaenea vorax* PJ13002. The micrographs are shown in FIGS. 1A-B.

Molecular identification was carried out, and 18S rDNA (primer EukA: 5'-AACCTGGTTGATCCTGCCAGT-3' (SEQ ID NO: 1); and primer EukB: 5'-TGATCCTTCTGCAGGTTCACCTAC-3' (SEQ ID NO: 2)) fragments were amplified and subjected to Sanger sequencing. Sequencing results were aligned to the NCBI database. Both ciliates were named for the most similarity to *Uronema marinum* and *Chaenea vorax*, respectively.

Example 2

Habits of *Chaenea vorax* PJ13002

*Chaenea vorax* PJ13002 was tested for the ranges of temperature (14-32° C.), salinity (10-40%), and pH (6-11).

At three temperatures (14, 25, and 32° C.), seven salinities (10%, 15%, 20%, 25%, 30%, 35%, and 40%) and five pH values (6.6, 7.6, 8.6, 9.6, and 10.6), the *Chaenea vorax* PJ13002 was tested for temperature adaptation range. There were a total of 15 treatments, and there were three parallel samples under each treatment. All conditions were the same except treatment conditions. Three *Chaenea vorax* PJ13002 were added to each group.

First, 1,000 mL of *Escherichia coli* suspension (OD=0.3) and approximately 100,000 *Uronema marinum* PJ20101A were added to a 2 L Erlenmeyer flask successively, and underwent static culture at 25° C. for 4 days. The mixture is incubated at 25° C. for 4 days without agitation. After incubation, thoroughly mix the liquid and prepare 45 Petri dishes with a diameter of 90 mm, each containing 20 ml culture medium.

1. Temperature

Three temperatures (14° C., 25° C., 32° C.) were set, with three Petri dishes for each temperature. After 20 mL culture medium was added, all Petri dishes were added with three *Chaenea vorax* PJ13002, and put at the corresponding temperature. The growth state was observed every day, and data statistics were performed according to the average value of the observed quantity of ciliates in the three Petri dishes at each temperature. The specific results are shown in Table 1.

TABLE 1

| | Day 1 | Day 2 | Day 3 | Day 4 | Day 5 | Day 6 | Day 7 |
|---|---|---|---|---|---|---|---|
| | colspan | | Effects of different temperatures on the number of *Chaenea vorax* PJ13002. | | | | |

Effects of different temperatures on the
number of *Chaenea vorax* PJ13002.

| | Day 1 | Day 2 | Day 3 | Day 4 | Day 5 | Day 6 | Day 7 |
|---|---|---|---|---|---|---|---|
| 14° C. | 3 | 3 | 11 | 32 | 47 | 74 | 165 |
| 25° C. | 3 | 4 | 162 | 887 | | | |
| 32° C. | 3 | 3 | 12 | 74 | 154 | 765 | |

From Table 1, *Chaenea vorax* PJ13002 could grow at all three temperatures: 14° C., 25° C., and 32° C.; at 14° C., the quantity of ciliates increased slowly, but feeding activities were frequent; at 25° C., the quantity of ciliates increased significantly, and feeding was active; and at 32° C., the quantity of ciliates increased significantly, but feeding was not active.

2. Salinity

Seven salinity levels (10%, 15%, 20%, 25%, 30%, 35%, 40%) were tested, with three Petri dishes set up for each salinity. Each culture dish was filled with 20 ml of sterilized seawater prepared at the respective salinity level (either diluted sterilized seawater or seawater prepared with sea salt); 360 mL of *Uronema marinum* PJ20101A was centrifuged (at 1,500 g for 5 min) to enrich, and aliquoted into each Petri dish; and three *Chaenea vorax* PJ13002 were added to each Petri dish and cultured at room temperature, and the growth thereof was observed every day.

The experimental results showed that *Chaenea vorax* PJ13002 could survive at seven salinities of 10%, 15%, 20%, 25%, 30%, 35%, and 40%, but at low and high salinities of 10%, 15% and 40%, there was no significant increase in the quantity of ciliates, and the feeding activities were reduced; at salinities of 20%, 25%, and 30%, the quantity increased significantly and feeding was active, among which the quantity of ciliates increased most significantly at a salinity of 30%.

3. pH

Five pH levels (6.6, 7.6, 8.6, 9.6, 10.6) were tested, with three Petri dishes set up for each pH level. After adding 20 mL of culture medium, pH values were adjusted with acid or alkali to make it reach the treatment concentration. Subsequently, three *Chaenea vorax* PJ13002 were added to each Petri dish and cultured at room temperature, and the growth was observed daily.

The experimental results showed that *Chaenea vorax* PJ13002 could survive at five pH values, but at pH 6.6 and 10.6, there was no significant increase in the quantity of ciliates; and at pH 7.6, 8.6, and 9.6, the quantity of ciliates increased significantly and feeding was active. Seawater itself is a buffer system that will spontaneously restore the pH value changed by biological growth, providing a stable pH microenvironment for the survival and division of *Chaenea vorax* PJ13002.

According to the experimental results, *Chaenea vorax* PJ13002 has a wide range of physiological tolerance to temperature, salinity, and pH value; the growth conditions thereof are in line with aquaculture conditions of *Scophthalmus maximus, Paralichthys olivaceus*, prawns, and flounders; and effective preying can be performed, so as to carry out biological control.

Example 3

Feeding Experiment of *Chaenea vorax* PJ13002

The feeding experiment of *Chaenea vorax* PJ13002 was carried out at two temperatures (14° C., the temperature commonly used in mariculture; and 18° C., the temperature corresponding to the outbreak of pathogenic ciliates), and six groups were divided: three control groups without adding *Chaenea vorax* PJ13002 and three experimental groups with each adding 50 *Chaenea vorax* PJ13002 were set up at each temperature.

First, six 100 mL Erlenmeyer flasks were used, and each flask was filled with 40 mL of *Escherichia coli* suspension (OD=0.3) and approximately 4,000 *Uronema marinum* PJ20101A were added to each flask successively. After static culture at 14 or 18° C. for two days, 50 *Chaenea vorax* PJ13002 were added to each Erlenmeyer flask in the experimental groups and thoroughly shaken every 24 h for sampling and counting. The densities of *Uronema marinum* PJ20101A and *Chaenea vorax* PJ13002 were measured.

The density measurement method was as follows: using a Gridded Sedgewick Rafter (1 mm$^2$; 400 μL of culture medium+100 μL of Bouin's Fixative), 100 μL of well-mixed fixative was pipetted and counted (N) under a dissecting microscope. The density in each Erlenmeyer flask was calculated using the following formula: Density=N/80× 1000=12.5N (individuals/mL).

The average values were calculated for the three control groups and three treatments, resulting in the densities of the control and treatment groups. The treatment density refers to the combined density of *Uronema marinum* PJ20101A and predatory ciliates PJ13002. Please refer to Tables 2-3 and FIGS. 2-3 for specific results.

TABLE 2

Statistics of the densities of the control and
treatment groups fed at 14° C.

| Day | Density of the control group (individuals/mL) | Density of the treatment (individuals/mL) |
|---|---|---|
| 1 | 8892 | 8892 |
| 2 | 29859 | 36869 |
| 3 | 60823 | 63043 |
| 4 | 58296 | 52660 |
| 5 | 56515 | 45609 |
| 6 | 61542 | 24497 |
| 7 | 55356 | 52771 |
| 8 | 63057 | 55220 |
| 9 | 70771 | 50632 |
| 10 | 75440 | 28201 |
| 11 | 64273 | 17139 |
| 12 | 60756 | 14613 |
| 13 | 61782 | 8605 |
| 14 | 59134 | 16357 |
| 15 | 45738 | 8457 |
| 16 | 49630 | 6220 |
| 17 | 44917 | 2558 |
| 18 | 41584 | 366 |
| 19 | 34557 | 1045 |
| 20 | 20316 | 221 |
| 21 | 11503 | 406 |

TABLE 3

Statistics of the densities of the control and treatment
groups fed at 18° C.

| Day | Density of the control group (individuals/mL) | Density of the treatment group (individuals/mL) |
|---|---|---|
| 1 | 8892 | 8892 |
| 2 | 67267 | 48181 |
| 3 | 78355 | 70457 |
| 4 | 91978 | 83681 |
| 5 | 78922 | 79596 |
| 6 | 86705 | 72800 |
| 7 | 71901 | 31785 |

TABLE 3-continued

| | Statistics of the densities of the control and treatment groups fed at 18° C. | |
| --- | --- | --- |
| Day | Density of the control group (individuals/mL) | Density of the treatment group (individuals/mL) |
| 8 | 77436 | 6643 |
| 9 | 79557 | 2095 |
| 10 | 75017 | 297 |
| 11 | 81296 | 86 |
| 12 | 76555 | 60 |
| 13 | 76660 | 49 |
| 14 | 52875 | 109 |
| 15 | 43172 | 156 |

Figure 2:
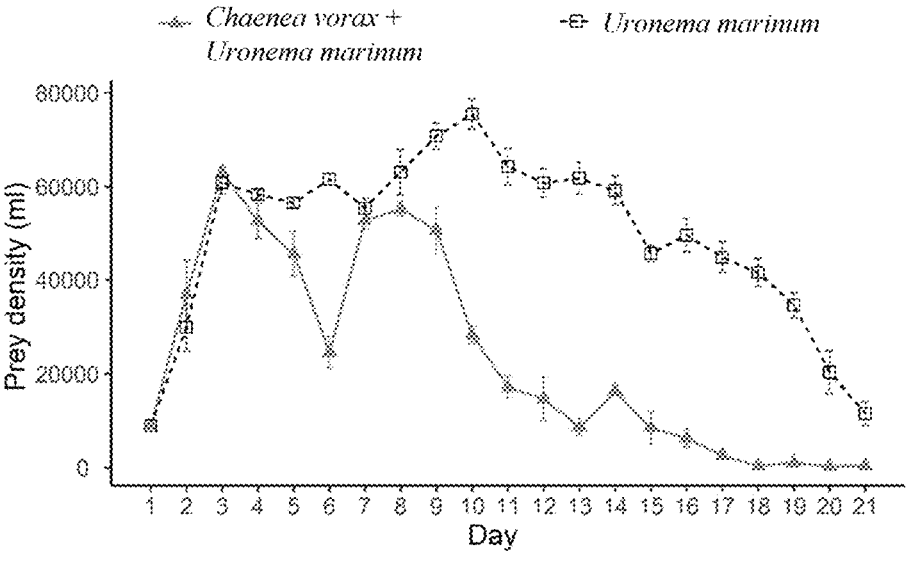
FIG. 2 shows results of a feeding experiment of *Uronema marinum* PJ20101A by *Chaenea vorax* PJ13002 at 14° C.
Figure 3:
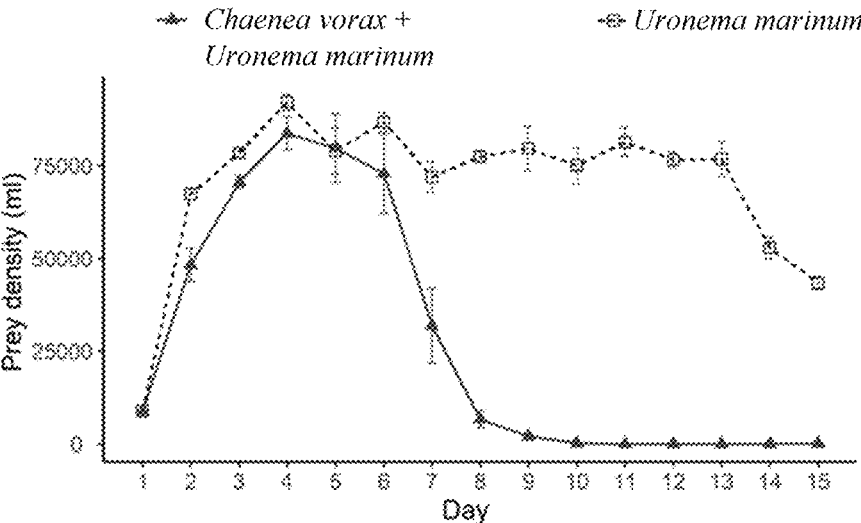
FIG. 3 shows results of a feeding experiment of *Uronema marinum* PJ20101A by *Chaenea vorax* PJ13002 at 18° C.

It can be seen from Tables 2 and 3 and FIGS. 2 and 3 that *Chaenea vorax* PJ13002 can effectively reduce the quantity of *Uronema marinum* PJ20101A in the culture system and achieve the biological control effect.

Experimental Example 1

Field Test

After an outbreak of scuticociliates (density 150-200 cells/mL; causing the disease of scuticociliatosis) in a 30 mu shrimp pond in Tianjin, 30 mL of the suspension of *Chaenea vorax* PJ13002 obtained in Example 3 was added to each of the four corners of the shrimp pond, after 7 days, it was observed that the quantity of scuticociliates in the affected pond was significantly reduced (to a density of 1-3 individuals/mL). Every 7 days, 5 mL of the suspension of *Chaenea vorax* PJ13002 obtained in Example 3 was added to each of the four corners of the shrimp pond, and the scuticociliates were always controlled at a very low density (0-1 individuals/mL). Finally, the shrimp yield of the pond was 850 individuals/mu.

According to past experience, after the outbreak of scuticociliate disease in uncontrolled prawn ponds, all prawns in the entire pond died and the output was not obtained.

It can be known from the field test that the biological control method provided by the present disclosure can reduce the quantity of scuticociliates in the aquaculture pond and achieve the control effect of ciliate disease.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A biological control method for ciliate disease, comprising adding *Chaenea vorax* to an aquaculture pond to control the ciliate disease, wherein the *Chaenea vorax* is *Chaenea vorax* PJ13002 with the deposit number CGMCC NO: 46992.

2. The biological control method according to claim 1, wherein the *Chaenea vorax* PJ13002 is available from an intertidal zone of Qingdao.

3. The biological control method according to claim 1, wherein the aquaculture pond is maintained at a temperature of 10-20° C., a salinity of 25-35%, and pH 6-9.

4. The biological control method according to claim 1, wherein based on a 30 mu aquaculture pond, the adding *Chaenea vorax* to an aquaculture pond specifically comprises:

if a density of ciliates is 0-5 individuals/mL, adding 4,000-6,000 *Chaenea vorax* to the aquaculture pond;
    if the density of ciliates is 6-50 individuals/mL, adding 8,000-12,000 *Chaenea vorax* to the aquaculture pond;

if the density of ciliates is 51-200 individuals/mL, adding 25,000-35,000 *Chaenea vorax* to the aquaculture pond;
    if the density of ciliates exceeds 200 individuals/mL, adding 95,000-110,000 *Chaenea vorax* to the aquaculture pond.

5. The biological control method according to claim 1, wherein the ciliates comprise scuticociliates.

6. The biological control method according to claim 5, wherein the scuticociliates comprise *Uronema marinum*.

7. The biological control method according to claim 6, wherein the *Uronema marinum* is *Uronema marinum* PJ20101A with the deposit number CGMCC NO: 46993.

8. The biological control method according to claim 6, wherein the *Uronema marinum* PJ20101A is available from an intertidal zone of Qingdao.

9. The biological control method according to claim 1, wherein animals cultivated in the aquaculture pond comprise *Scophthalmus maximus, Paralichthys olivaceus,* prawns, and flounders.

* * * * *

SEQUENCE LISTING

```
Sequence total quantity: 2
SEQ ID NO: 1          moltype = DNA  length = 21
FEATURE               Location/Qualifiers
source                1..21
                      mol_type = other DNA
                      organism = synthetic construct
SEQUENCE: 1
aacctggttg atcctgccag t                                        21

SEQ ID NO: 2          moltype = DNA  length = 24
FEATURE               Location/Qualifiers
source                1..24
                      mol_type = other DNA
                      organism = synthetic construct
SEQUENCE: 2
tgatccttct gcaggttcac ctac                                     24
```